United States Patent [19]

Work et al.

[11] 4,397,499
[45] Aug. 9, 1983

[54] VEHICULAR T-ROOF LOCKING DEVICE

[76] Inventors: Beverly M. Work; Frederick T. Work, Jr., both of 1431 W. 6th Ave., Gary, Ind. 46402; Charles O. Scull, 601 Taft Pl., Gary, Ind. 46404

[21] Appl. No.: 241,579

[22] Filed: Mar. 9, 1981

Related U.S. Application Data

[63] Continuation of Ser. No. 75,132, Sep. 12, 1979, abandoned.

[51] Int. Cl.³ ............................................... B60J 7/10
[52] U.S. Cl. .................................... 296/218; 296/224; 292/259 R
[58] Field of Search ............... 296/218; 292/224, 338, 292/339, 259, 268, 269, 277; 49/463, 465, 50, 57

[56] References Cited

U.S. PATENT DOCUMENTS

| 1,414,162 | 4/1922 | Wilt | 292/259 |
| 3,752,518 | 8/1973 | Cannell | 292/259 |
| 4,133,576 | 1/1979 | Chrysler | 296/218 |

Primary Examiner—Robert R. Song
Attorney, Agent, or Firm—Sabin C. Bronson

[57] ABSTRACT

The present apparatus acts to lock removable roof panels, commonly associated with automobiles and the like, in place as a protection for example, against the theft of such panels. The system involves one or more bars each having two ends and a lock device. One end of each bar is adapted to be fastened or secured to one of the roof panels. The other end of the bar is adapted to be temporarily secured to the fixed roof portion of the vehicle by the lock device. With the lock device in place, the roof panels are secured in place. These panels can be removed by opening the lock device.

6 Claims, 5 Drawing Figures

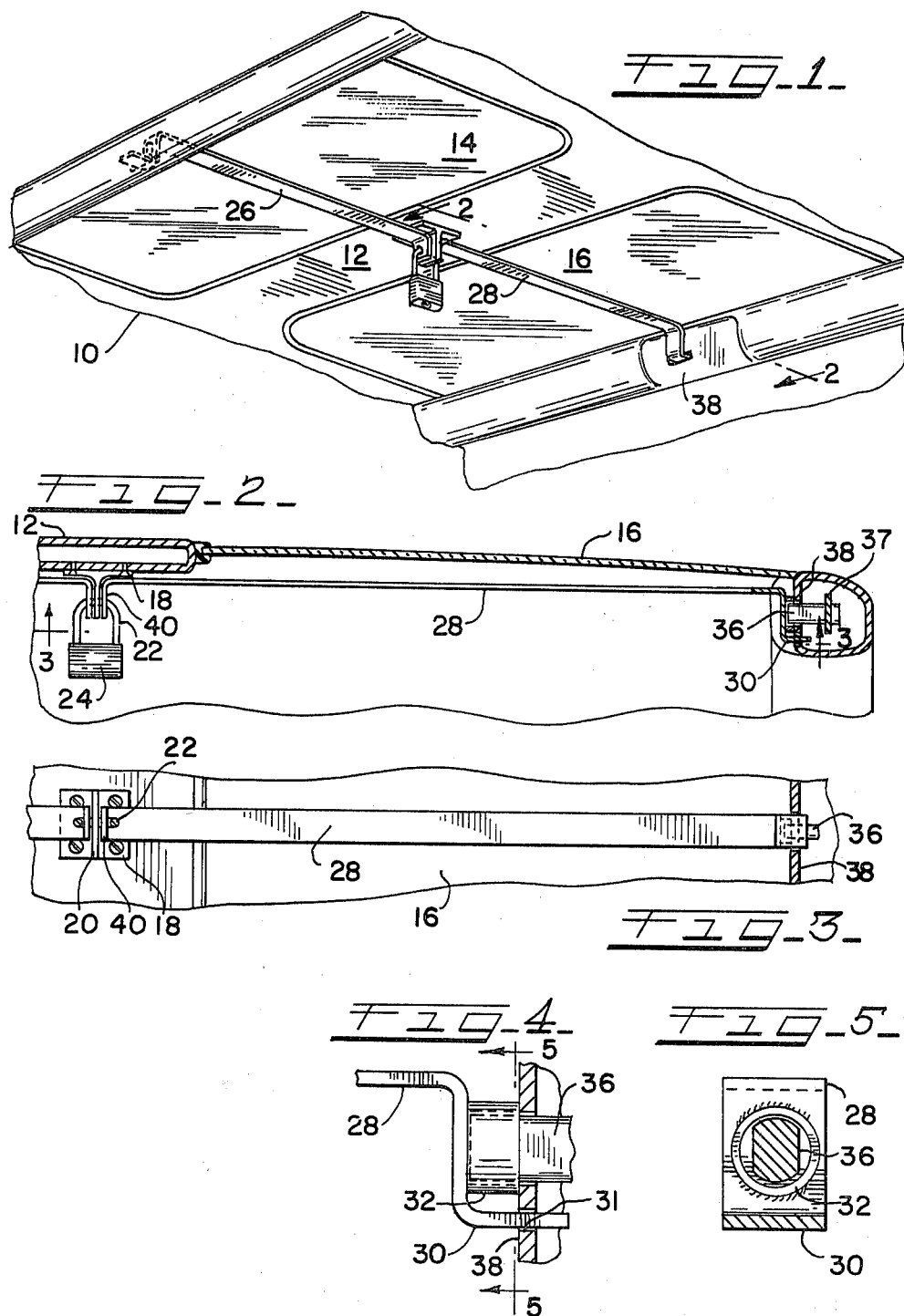

VEHICULAR T-ROOF LOCKING DEVICE

This is a continuation of application Ser. No. 75,132, filed Sept. 12, 1979 now abandoned.

BACKGROUND AND SUMMARY OF THE INVENTION

This invention relates to removable roof panels associated with transportation vehicles. More particularly, this invention relates to the protection of such panels from theft, vandalism and the like.

Automobiles and other transportation vehicles having at least one removable roof panel are becoming increasingly popular. One concern of the owners of such vehicles involves safeguarding such panels from theft, vandalism and the like. For example, vehicle manufactures have provided very simple and easy to operate mechanisms to remove these roof panels for the convenience of the vehicle owner. However, such roof panels have become easy prey to thieves and vandals. Thus, it clearly is desirable to protect such roof panels.

Therefore, one object of the present invention is to provide an improved apparatus to protect removable vehicular roof panels, e.g., from theft, vandalism and the like.

Another object of the present invention is to provide an apparatus for locking or securing removable vehicular roof panels in place in the roof of the vehicle.

A still further object of the present invention is to provide a locking system for removable vehicular roof panels which can be easily opened by the vehicle owner to permit removal of the panels. These and other objects of the present invention will become apparent hereinafter.

An improved apparatus for locking at least one roof panel, preferably a plurality of roof panels, associated with a transportation vehicle in place in the roof of the vehicle has now been discovered. In general, such roof panels may further be defined as being removably fitted or secured in the vehicle roof which includes at least one fixed roof portion, i.e., a roof portion which is permanently affixed to one/or a part of the main frame of the vehicle. In one aspect, the present apparatus comprises a bar component having first and second ends. The first end is capable of being fastened or secured, e.g., temporarily fastened or secured, to the removable roof panel, while the second end is capable of being temporarily secured to the fixed roof portion of the vehicle roof. A lock device is provided which is capable of associating with the second end of the bar component and the fixed roof portion to temporarily secure this second end to the fixed roof portion.

With the lock device in place as indicated above, the removable roof panel is locked in place in the roof of the vehicle. Thus, a simple, reliable, maintenance free system is provided to protect such roof panels which are normally vulnerable to theft, vandalism and the like. In addition, the lock device may be easily and quickly opened, i.e., to remove the temporary securement of the second end of the bar component, to facilitate the removal of the roof panel or panels, as desired by the owner. Thus, the present system does not unduly impede the vehicle owner's use and enjoyment of the removable roof panel or panels.

In one preferred embodiment, a plurality of removable roof panels is involved. In this instance, the present system further comprises an additional bar component or components, as defined above, so that the first end of each of the bar components is capable of being fastened to a different one of the panels and the second end of each of the bar components is capable of being temporarily secured to the fixed roof portion. In other words, the number of removable roof panels equals the number of bar components. In this embodiment, a plurality of lock devices, equal in number to the number of bar components, may be provided, each lock device being capable of associating with the second end of a different, individual bar component and the fixed roof portion to temporarily secure the second end of the individual bar component to the fixed roof portion. Preferably, a single lock device is provided with which is capable of associating with the second ends of all the bar components and the fixed roof portion to temporarily secure all such second ends to the fixed roof portion.

In a still further preferred embodiment, the number of removable roof panels equals two and the number of bar components equals two. In this configuration, the fixed roof portion is preferably located between the removable roof panels.

Another aspect of the invention involves a fixed roof portion which includes at least one roof extension secured to the fixed roof portion. With the roof extension or extensions in place, the lock device or devices are capable of associating the second end of the bar component or components and the roof extension or extensions, thereby locking the roof panel or panels in place in the vehicular roof. A single roof extension and a single lock device may be used in association with a plurality of removable roof panels and bar components.

The removable roof panels may be constructed of any suitable material. However, in one preferred construction at least a portion of these panels are constructed of transparent material so that the vehicle's driver or passenger can see through the panels even when the panels are in place in the roof of the vehicle.

These and other aspects and advantages of the present invention are set forth in the following detailed description and claims particularly when considered in conjunction with the accompanying drawings in which like parts bear like reference numerals.

BRIEF DESCRIPTION OF THE DRAWINGS

In the drawings:

FIG. 1 is a partial view in perspective, showing a portion of the underside of an automobile roof with an embodiment of the present apparatus installed.

FIG. 2 is a cross-sectional view taken along line 2—2 of FIG. 1.

FIG. 3 is a cross-sectional view taken along line 3—3 of FIG. 2.

FIG. 4 is a front elevation view of one portion of the system shown in FIG. 1.

FIG. 5 is a cross-sectional view taken along line 5—5 of FIG. 4.

DESCRIPTION OF THE PREFERRED EMBODIMENT

Referring now to the drawings, FIG. 1 shows a vehicular roof, shown generally at 10, which includes central roof segment 12. Two removable roof panels 14 and 16 are shown in place of roof 10. T-angle 18 is attached to and extends down from central roof segment 12. Depending leg 20 of T-angle 18 includes a hole through which the locking bar 22 of padlock 24 is adapted to pass as indicated hereinafter.

Rods 26 and 28 are provided for association with roof panels 14 and 16, respectively.

First end 30 of rod 28 is formed in the shape of a reverse S as shown in FIG. 4. Welded to first end 30 of rod 28 is hollow connector 32. Corresponding components are associated with rod 26 and function in the identically same manner as those components set forth herein as being associated with rod 28.

Peg 36 projects from a standard lift-off panel latch assembly, shown generally at 37. Both peg 36 and latch assembly 37 are components of a conventional sliding rod securing mechanism which is conventionally used to secure roof panels, e.g., such as roof panels 14 and 16 in place in a roof, such as roof 10. Thus, as is conventional, peg 36 is fastened to a handle (not shown) and is turned, (by manually turning the handle), thus causing latch assembly 37 to move resulting in the unlocking of roof panel 16 from the body of the vehicle. In effect, the present locking device presents access to peg 36 so that roof panel 16 remains locked in place in roof 10. Hollow connector 32 is fitted (fastened) around peg 36. To further secure connector 32 in place around peg 36, the tip of first end 30 is inserted through a hole 31 in the wall 38 of roof panel 16.

The second end 40 of rod 28 is formed at a right angle with respect to the main body of rod 28 as shown in FIG. 2. Second end 40 has a hole through which the locking bar 22 of padlock 24 is adapted to pass.

With padlock 24 in place and locked, locking bar passes through holes located in second end 42 of rod 26, depending leg 20 of T-angle 18 and second end 40 of rod 28. First end 30 of rod 28 positioned so that, as shown in FIG. 4, the tip of first end passes through a hole 31 in wall 38, and peg 36 extends into hollow connector 32. As noted previously, rod 26 is configured similarly to rod 28 and has components similar to those associated with rod 28 to permit proper functioning of rod 26.

With rods 26 and 28 in place and padlock 24 locked as indicated above, removable roof panels 16 and 14 are held securely in proper position in the roof 10. In this mode, roof panels 14 and 16 are protected against theft and vandalism.

Removal of roof panel 16 is accomplished as follows. (Removal of roof panel 14 is carried out in a similar fashion). Padlock 24 is unlocked and lock bar 22 is disengaged from the hole in second end 40 of rod 28. With second end 40 of rod 28 free, hollow connector 32 is disengaged from peg 36 so that rod 28 is removed from the roof panel assembly. At this point, roof panel 16 can be easily removed from in the conventional manner, i.e. a handle is attached to peg 36 and peg 36 is turned to release roof panel 16 from the body of the vehicle.

Roof panels 14 and 16 and rods 26 and 28 can be conveniently stored until needed. Roof panel 16 can be reinstalled in roof 10 as follows. Roof panel 16 is placed in roof 10 as shown in FIGS. 1 and 2. Rod 28 is positioned so that hollow connector 32 engages peg 36 and the hole in second end 40 of rod 28 is aligned with the hole in depending leg 20 of T-angle 18. Lock bar 22 of padlock 24 is made to pass through these aligned holes and padlock 24 is locked. Again, roof panel 16 (and likewise roof panel 14) are securely locked in place in roof 10 and are protected from theft and vandalism. If desired, roof panels 14 and 16 can be easily removed as indicated above.

Having thus described my invention, what I claim and desire to secure by Letters Patent is:

1. An apparatus capable of locking a plurality of roof panels, associated with a transportation vehicle in place in the roof of said vehicle, each of said panels being removably fitted in said roof and latched to said roof by a latch assembly including a peg which is capable of being turned to deactivate said latch assembly, thereby releasing said panel from said roof, said roof including at least one fixed roof portion, which apparatus comprises a plurality of bar means each having a first and second end, said first end having connected thereto a sleeve means capable of receiving at least a portion of said peg, thereby preventing said peg from being turned and said latch means from being deactivated, and said second end capable of being temporarily secured to said fixed roof portion; and, single lock means capable of associating with said second end of each of said bar means and said fixed roof portion to temporarily secure each said second end to said fixed roof portion thereby locking said roof panels in place in said roof of said vehicle.

2. The apparatus of claim 1 wherein at least a portion of each said roof panel is transparent.

3. The apparatus of claim 1 wherein the number of said roof panels equals two and the number of said bar means equals two.

4. The apparatus of claim 1 wherein said fixed roof portion to which both said second ends may be temporarily secured is located between said roof panels.

5. The apparatus of claim 1 wherein said fixed roof portion includes a roof extension secured to said fixed roof portion and said lock means is capable of associating said second ends of said bar means and said roof extension.

6. The apparatus of claim 1 wherein said roof extension is located between said roof panels.

* * * * *